United States Patent [19]
Batra

[11] Patent Number: 6,151,239
[45] Date of Patent: Nov. 21, 2000

[54] DATA PACKET WITH EMBEDDED MASK

[75] Inventor: Pradeep Batra, Santa Clara, Calif.

[73] Assignee: Rambus Inc., Mountain View, Calif.

[21] Appl. No.: 09/440,206

[22] Filed: Nov. 15, 1999

Related U.S. Application Data

[62] Division of application No. 09/165,504, Oct. 2, 1998.

[51] Int. Cl.[7] ........................................... G11C 13/00
[52] U.S. Cl. ................................ 365/120; 365/52; 365/63
[58] Field of Search ............................... 365/120, 52, 63

[56] References Cited

U.S. PATENT DOCUMENTS

| | | | |
|---|---|---|---|
| 5,948,080 | 9/1999 | Baker | 710/37 |
| 5,966,731 | 10/1999 | Barth et al. | 711/167 |
| 5,971,923 | 10/1999 | Finger | 600/437 |
| 6,006,286 | 12/1999 | Baker et al. | 710/22 |

OTHER PUBLICATIONS

Direct RDRAM™ 256/288–Mbit (512K×16/18×32s) Datasheet, Rambus, Sep. 4, 1998, 62 pages.

*Primary Examiner*—David Nelms
*Assistant Examiner*—Thong Le
*Attorney, Agent, or Firm*—Blakely, Sokoloff, Taylor & Zafman LLP

[57] ABSTRACT

An apparatus and method for storing data in a memory. Mask information is embedded in a data packet and used to indicate memory locations at which data values in the data packet are to be stored.

23 Claims, 7 Drawing Sheets

DATA PACKET WITH EMBEDDED MASK

This is a division of application Ser. No. 09/165,504, filed on Oct. 2, 1998.

FIELD OF THE INVENTION

The present invention relates to the field of data storage, and more particularly to writing data to a memory.

BACKGROUND OF THE INVENTION

Although many modern processors can operate on relatively small units of data, transfers of data to and from a memory are often limited to relatively coarse data units of eight bytes, sixteen bytes or more. The smallest unit of data that can be transferred to a memory in a single transfer operation defines the word-size of the memory. Generally, it is not a problem to read a unit of data smaller than a memory word (i.e., sub-word data). A complete memory word is read from memory and the sub-word data of interest is extracted by the memory controller or the requesting agent. Difficulty arises, however, when attempting to write sub-word data, because the sub-word data cannot be written to memory without writing an entire memory word. Unless the portion of the memory word excluding the sub-word data to be written matches the contents of memory at the target address, valid data may be overwritten and lost.

Two different types of write operations can be used to write sub-word data without undesirable side effects: merged write operations and masked write operations. In a merged write operation, a memory word is read from target memory region, then the sub-word data to be written is substituted for a portion of the memory word. This substitution is called a merge operation and produces a merged memory word. Because the portion of the merged memory word exclusive of the substituted sub-word data contains the same data as the target memory region, only the sub-word data is written, in effect, when the merged memory word is stored in the target memory region.

One disadvantage of merged write operations is that it is usually necessary to read the contents of the memory region to be written in order to produce the merged memory word, thereby requiring both a read memory access and a write memory access to complete a single merged write operation. This tends to significantly reduce the rate at which data can be written to memory.

In a masked write operation, mask information is transferred to the memory to indicate portions of the memory word that should not be written (i.e., masked portions of the memory word). Logic within the memory interprets the mask information and stores only the unmasked portion of the memory word.

Figure 1:
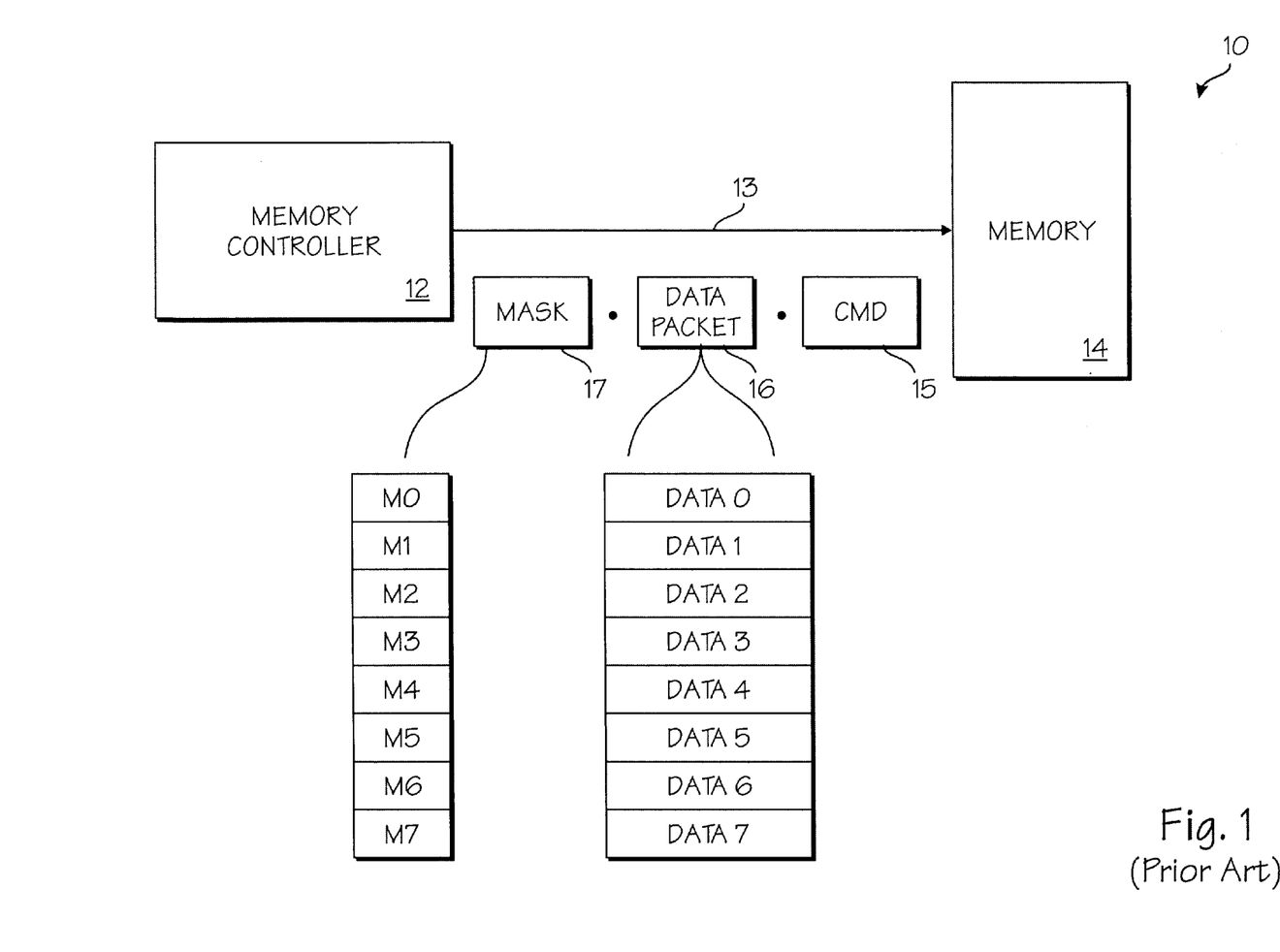
FIG. 1 is a diagram of a prior art memory system that can be used to perform a masked write operation.

FIG. 1 is a diagram of a prior art memory system 10 that can be used to perform a masked write operation. The memory system 10 includes a memory controller 12 and a memory 14 coupled to one another by a communication channel 13. To initiate a masked write operation (e.g., in response to a request for a sub-word write from a processor or other agent), the memory controller 12 first issues a write command (CMD) 15 to the memory 14 indicating that a word of data is to be written in the memory 14 at a write address specified in the command 15. Next the memory controller 12 transfers the memory word to the memory device. In his case, the memory word is a data packet 16 containing eight data values, Data0–Data7, that are transferred in sequence across the communication channel 13. Lastly, the memory controller 12 transfers mask data 17 to the memory 14 to indicate which bytes within the data packet 16 are masked and which bytes are unmasked. In this case, the mask data 17 is an eight-bit value, with each of bits M0–M7 indicating whether a respective one of the eight data values, Data0–Data7, is masked or unmasked. Logic within the memory 14 stores the unmasked data values at addresses in memory 14 that are offset from the write address according to the respective positions of the data values within the data packet 16. For example, an unmasked data value in position zero of the data packet 16 is stored at the write address, an unmasked data value in position one of the data packet 16 is stored at the write address plus one, and so forth so that, generally, an unmasked data value in position N of the data packet 16 is stored at the write address plus N.

One drawback to the masked write scheme illustrated in FIG. 1 is that the mask data 17 consumes bandwidth on the communication channel 13. This is true regardless of the order in which the command 15, data packet 16 and mask data 17 are transferred, and regardless of whether the communication path 13 is wide enough to support concurrent transfer of the command 15 and the mask information 17. The mask data 17 still consumes bandwidth that could otherwise be used to transfer other commands. This is significant, because memory 14 typically includes multiple memory devices coupled to the communication channel 13, so that availability of the communication channel 13 becomes a performance-limiting characteristic. Consequently, reducing the communication channel bandwidth consumed by masked write operations can substantially improve the performance of the memory system.

SUMMARY OF THE INVENTION

A method and apparatus for storing data in a memory are disclosed. A data packet is received that includes a plurality of data values and a mask value. Each of the plurality of data values is stored at a respective memory location having an address that is offset from a base address according to the mask value.

Other features and advantages of the invention will be apparent from the accompanying drawings and from the detailed description that follows below.

BRIEF DESCRIPTION OF THE DRAWINGS

The present invention is illustrated by way of example and not limitation in the figures of the accompanying drawings in which like references indicate similar elements and in which.

DETAILED DESCRIPTION

It is an intended advantage of embodiments disclosed herein to conserve bandwidth on a communication channel between a memory controller and a memory device by embedding mask information in a data packet and using the mask information to indicate memory locations at which data values in the data packet are to be stored. In at least one embodiment, the mask information is embedded in the data packet at a predetermined position and the presence of the mask information is indicated by a special write command called a "writemask" command. When a writemask command and associated data packet are received in a memory device, logic within the memory device automatically interprets a value (or values) in the predetermined position within the data packet to be mask information and uses the mask information to determine where each data value in the data packet is to be stored relative to a base address.

From one perspective, embodiments described herein exploit the fact that, if a masked write operation is needed, then at least one data value within a packet of data will be masked and therefore does not need to be transferred to the memory device. Consequently, the packet space otherwise used to transport the unneeded data value can instead be used to deliver the mask information. In this way, the overhead required to transfer mask information in a write mask operation is effectively hidden in the data transfer itself, thereby conserving bandwidth on the communication channel.

Figure 2:
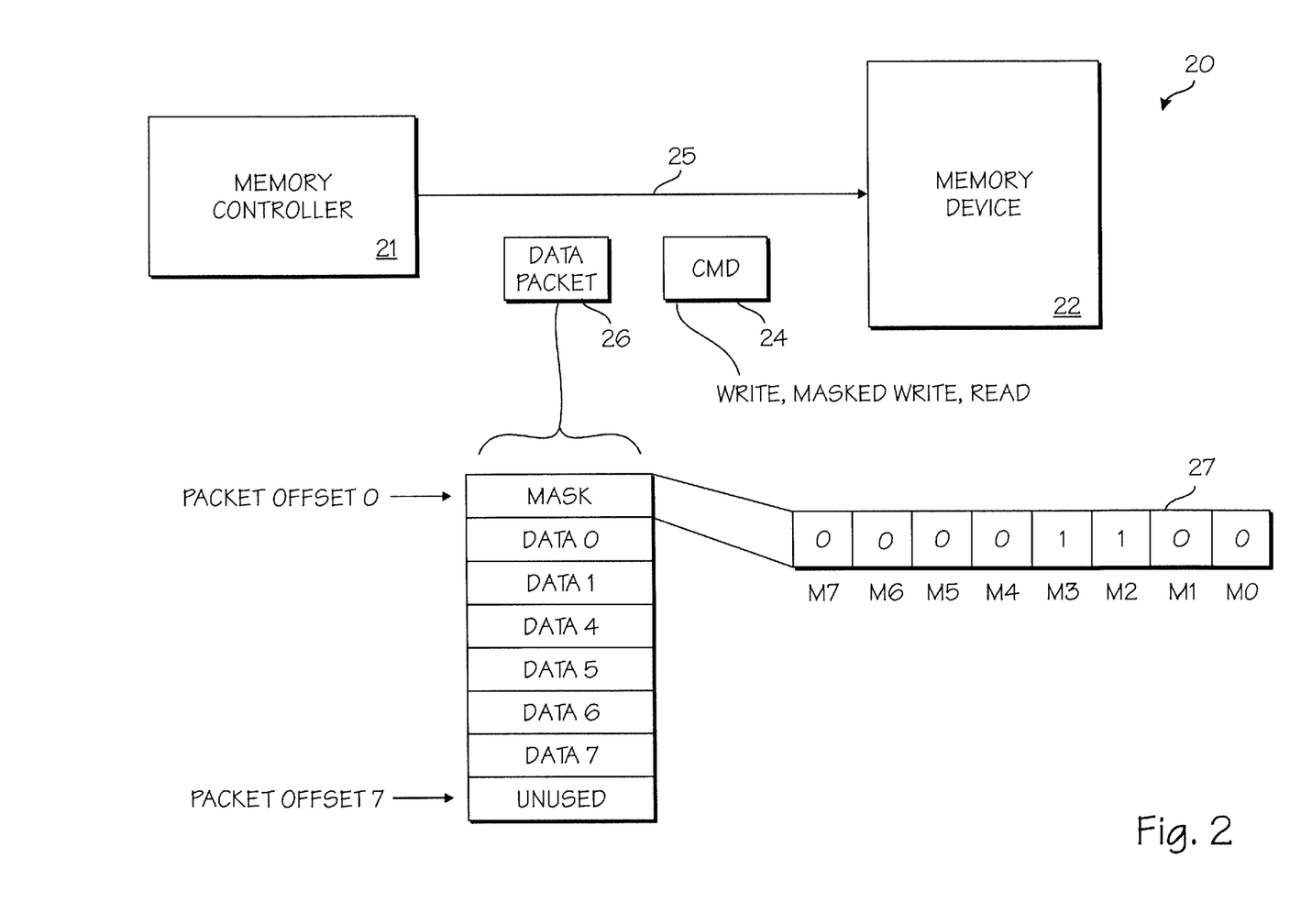
FIG. 2 is a diagram of a memory system for performing a masked write operation according to one embodiment.

FIG. 2 is a diagram of a memory system 20 for performing a masked write operation according to one embodiment. The memory system 20 includes a memory controller 21 and a memory device 22 coupled to one another by a communication channel 25. To perform a write operation, the memory controller issues a command 24 and a data packet 26. The command 24 may precede the data packet 26 as indicated in FIG. 2, or the command 24 and the data packet 26 may be transferred concurrently on respective portions of the communication channel 25. Herein, the term data packet refers to a plurality of values that are transferred to or from a memory that includes one or more memory devices. The term value refers to a unit of information such as a byte, word (two bytes), double word (four bytes), octbyte (eight bytes), dualoct (16 bytes) or other informational entity. A data packet typically includes at least as many values as required to meet the word-size of the memory and may include more values than the word-size of the memory.

In one embodiment of the memory system 20, the data packet 26 includes a predetermined number of values that are transferred on the communication channel 25 in a temporal sequence. In an alternate embodiment, the data packet 26 may include a predetermined number of values transferred concurrently across the communication channel 25. For example, the data packet 26 may be made up of eight bytes transferred at the same time on respective portions of a 64-bit bus. In yet another embodiment of the memory system 20, the data packet 26 may be transferred across the communication channel 25 in groups of values with multiple groups being transferred at the same time. For example, the data packet 26 might include two groups of eight bytes each, the two groups being transferred on respective portions of the communication channel 25 at the same time, but with the values within each group being transferred in a temporal sequence.

In one embodiment, the memory device 22 interprets the contents of the data packet 26 according to the command 24. If the command 24 is a simple write command (i.e., not a writemask command), then all the values in the data packet 26 are considered to be data values and are written to storage within the memory device 22. Further, a correspondence is assumed between the offset of a value within the data packet 26 (the "packet offset") and the offset between the memory location to which the value is destined and a base address. For example, the first value in the packet is at packet offset zero and is destined to a memory location at the base address, the value at packet offset one is destined to a memory location at the base address plus one, the value at packet offset two is destined to a memory location at the base address plus two and so forth.

The offset between the base address and the memory location to which a value is destined is referred to herein as a "write offset". In alternate embodiments, the incremental write offset may be greater than one, depending on the number of memory locations required to store each data value.

In one embodiment, a masked write operation is initiated when the memory controller 21 issues a writemask command to the memory device 22 and places a mask value 27 in the first entry of the data packet 26 (i.e., at packet offset zero). The memory device 22 responds to the writemask command by automatically interpreting the value at packet offset zero to be a mask value. Thus, by placing the mask value 27 in a predetermined entry of the data packet 26 and signaling the presence of the mask value 27 with a writemask command, a protocol is established that allows mask information to be passed between the memory controller 21 and the memory device 22 without the need for a separate transfer of the mask information.

One consequence of placing the mask value 27 in a predetermined entry of the data packet 26 is that the data value that would otherwise have occupied the entry is displaced. Referring to FIG. 2, for example, the mask value 27 is placed at packet-offset zero and therefore displaces Data0, the value destined for write-offset zero (herein, the data value destined for a given write-offset, i, is designated Data(i), i being an integer). Consequently, unless Data0 is masked, Data0 must be placed in another entry in the data packet 26, possibly displacing another data value. Thus, the correspondence between the packet offset and write offset is lost when a mask value is embedded in a data packet at a predetermined entry and another technique for determining the write offset of the data values in the data packet is needed.

In one embodiment, the respective write offsets of data values in a data packet are determined based on the embedded mask value 27. This is possible because the mask value 27 indicates which data values are included in the data packet (i.e., unmasked values) and which data values are not included (i.e., masked values). By establishing a data packing protocol between the memory controller 21 and the memory device 22, it becomes possible for the memory device 22 to determine the write offset of each data value in the data packet based on the embedded mask value.

In one packing protocol, referred to herein as a linear packing protocol, unmasked data values are inserted into adjacent, successive entries within the data packet so that any unused entries within the data packet occur at the end of the data packet. The data packet 26 in FIG. 2 illustrates the linear packing protocol. The unmasked data values are packed in successive entries after the mask value in the following order: Data0, Data1, Data4, Data5, Data6, and Data7. The final entry within the data packet 26 (i.e., the entry at packet offset seven) is unused. Note that, at least from the perspective of the memory device 22, the write offset of any data value in the data packet 26 is without reference to the mask value. The mask value indicates which data values are present in the data packet 26, and thus indicates, by virtue of the packing protocol, the write offset of each data value in the data packet 26.

Figure 3:
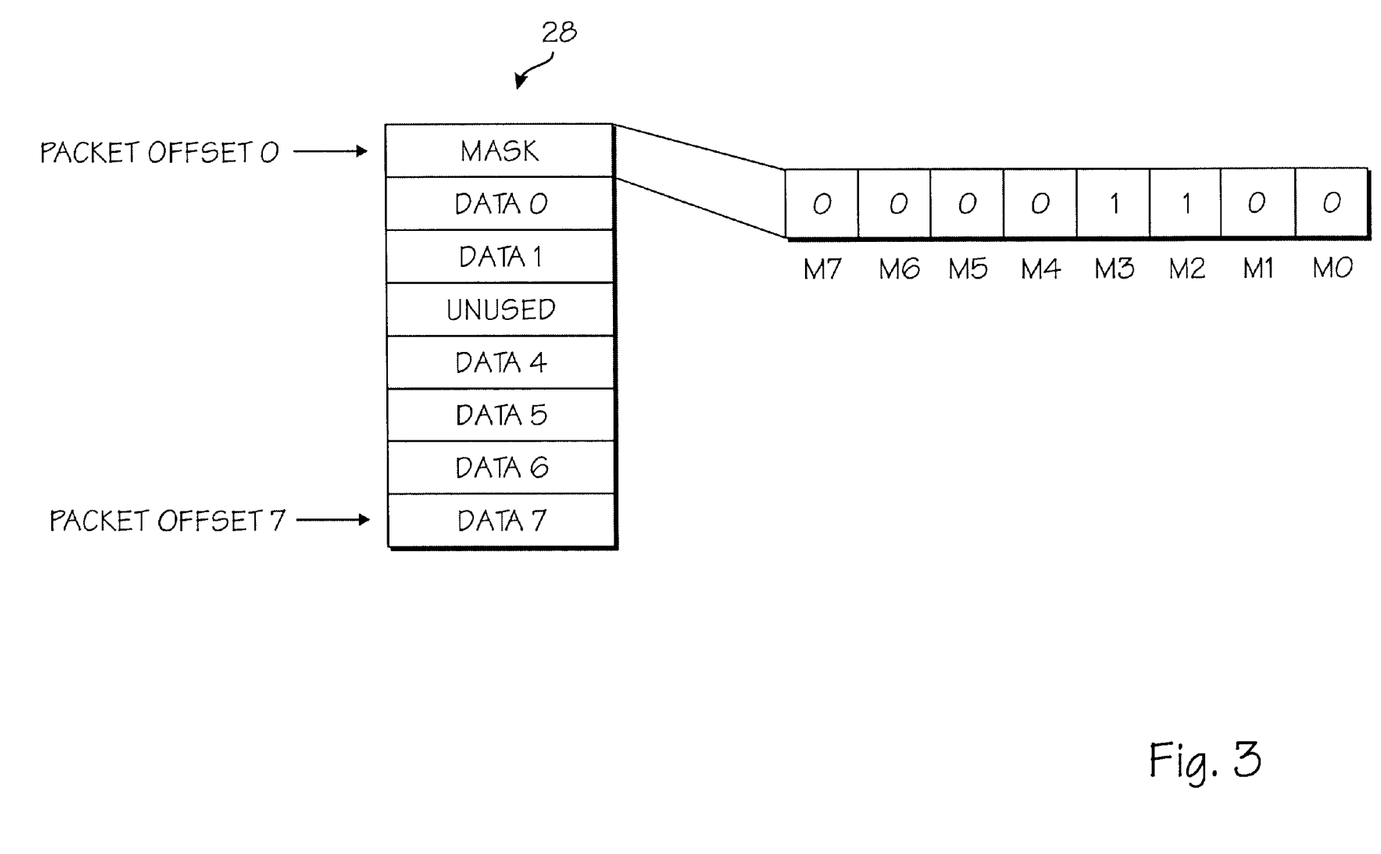
FIG. 3 illustrates a data packet that has been packed according to a fragmented packing protocol.

FIG. 3 illustrates a data packet 28 that has been packed according to an alternate packing protocol, referred to herein as a fragmented packing protocol. In the fragmented packing protocol, data values are packed at packet offsets equal to their respective write offsets plus one until a packet entry having packet offset equal to the write offset of a masked value is filled. For the packet entries that follow, unmasked data values are packed at packet offsets equal to their write offsets.

Referring to FIG. 3, for example, Data0 is packed at packet offset one (i.e., packet offset=write offset+1=1) and Data1 is packed at packet offset two. Data2, however, is masked. Consequently, for the packet entries that follow (i.e., entries having packet offsets three-seven), data values are packed at a packet offset equal to their write offsets. Data3 is masked, so that packet offset three remains unused. Data4, Data5, Data6 and Data7 are packed at packet offsets four, five, six and seven, respectively. Note that if there are at least N−1 data values present in a data packet (N being the number of values that the data packet can hold), then data values are packed identically in the linear and fragmented packing protocols. Other packing protocols may be used in alternate embodiments without departing from the spirit and scope of the present invention.

Figure 4:
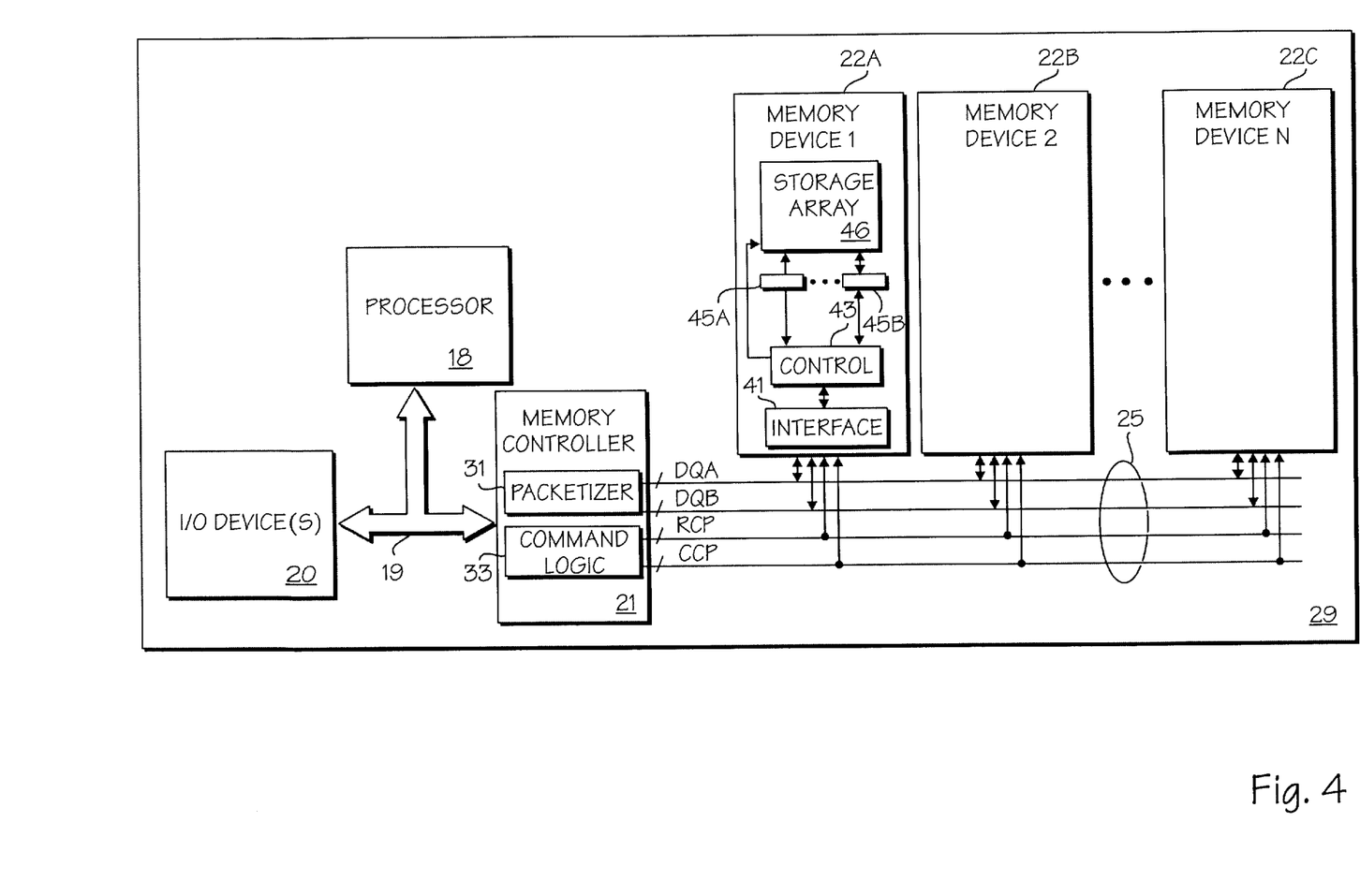
FIG. 4 is a block diagram of an apparatus in which embodiments of the present invention may be used.

FIG. 4 is a block diagram of an apparatus 29 in which embodiments of the present invention may be used. The apparatus 29 may be a computer, a handheld organizer, a digital camera or any other device in which rapid memory access is desirable. The apparatus 29 includes a processor 18, a memory controller 21 and input/output (I/O) devices 20 all intercoupled by one or more buses 19. Although the buses 19 are depicted in FIG. 4 as being an uninterrupted communication path between the processor 18, the memory controller 21 and the I/O devices 20, the buses 19 may include intermediate logic which separates the bus 19 into component parts. For example, in the case of a desktop computer or workstation, the processor 18 may be connected to a subsystem controller via a local bus, with the subsystem controller being directly connected to one or more of the I/O devices 20 (e.g., direct connection to a graphics controller via an Accelerated Graphics Port) and being connected to others of the I/O devices 20 via a bus bridging device for another bus (e.g., a peripheral component interconnect (PCI) bus, an industry standard architecture (ISA) bus, and extended industry standard architecture (EISA) bus, a Microchannel bus, and so forth). In such an apparatus, the memory controller 21 may be integrated into the subsystem controller.

The exact nature of the I/O devices 20 depends on the application of the apparatus 29. For example, in a desktop computer, the I/O devices 20 will typically include user input devices (e.g., keyboard, mouse, trackball, stylus and so forth), a display device, one or more mass storage devices (e.g., fixed magnetic disk, removable magnetic disk, removable optical disk and so forth) a computer network connection device (e.g., a modem, local area network connection device and so forth) and various output devices (e.g., audio out, printer and so forth). In a consumer electronics device, such as a digital camera, the I/O devices 20 will typically include a user interface (e.g., buttons), a display and various camera specific controls (e.g., flash control, iris control, shutter control, focus control and so forth).

The apparatus 29 includes a number of memory devices 22A, 22B, 22C that are coupled to the memory controller 21 via a communication channel 25. Together, the memory controller 21, the communication channel 25 and the memory devices 22A, 22B, 22C form a memory subsystem. The memory controller 21 receives requests to read and write data from various requesting agents, including the processor 18 and one or more of the I/O devices 20, and responds by issuing the appropriate signals on the communication channel 25 to fulfill the requested read and write operations.

According to one embodiment, the communication channel 25 includes two data paths DQA and DQB each of which is capable of transferring data to and from the memory devices 22A, 22B, 22C concurrently with the other. The communication channel 25 also includes two command paths: a row control path (RCP) and a column control path (CCP). In response to read and write requests from requesting agents, command logic 35 in the memory controller 21 issues commands on one or both of the row control path and the column control path. The commands typically include address information that indicates a region of memory to be accessed within one of the memory devices 22A, 22B, 22C. For write operations, a packetizer 31 within the memory controller 21 generates write data packets and issues the packets on one or both of the data paths DQA and DQB. The communication channel 25 also includes other signal paths not shown, including, for example, signal paths for transmitting clock signals between the memory controller 21 and the memory devices 22A, 22B, 22C.

In one embodiment, the memory devices 22A, 22B, 22C are dynamic random access memory (DRAM) devices that include internal storage arrays arranged in one or more banks of dynamic memory cells. The general structure of the DRAM devices 22A, 22B, 22C is illustrated in memory device 1 (22A). The DRAM devices 22A, 22B, 22C are coupled to the communication channel 25 via an interface 41 and include control logic 43 to process the commands and data received via the interface 41. The DRAM devices 22A, 22B, 22C also include a DRAM core made up of a storage array 46 containing one or more banks of memory cells and one or more banks of sense amplifier arrays 45A, 45B. In response to signals from the control logic 43, data from a row of memory cells within a selected bank in the storage array 46 is transferred to a sense amplifier array 45A,45B. This is called an activate operation and the bank of data is said to be "active." The sense amplifier array acts as a buffer for the data from the sensed row of memory cells. Consequently, read and write operations addressed to columns of data within the sensed row can be performed on the buffer contents until the buffer is closed in a precharge operation. In one embodiment, commands which request activation or precharge of a row of memory cells ("row commands") are transferred on the row control path and commands to read data from or write data to columns of data in an activated row ("column commands") are transferred on the column control path. Thus, a command to write data at a base address may be thought of as including two component commands: a row command which senses a row of memory cells within a selected bank within a selected memory device; and a column command which reads or writes a column of data (e.g., eight bytes) within the activated bank. Each of the component commands includes at least a portion of the information required to identify a unique region of memory within the memory subsystem.

Figure 5:
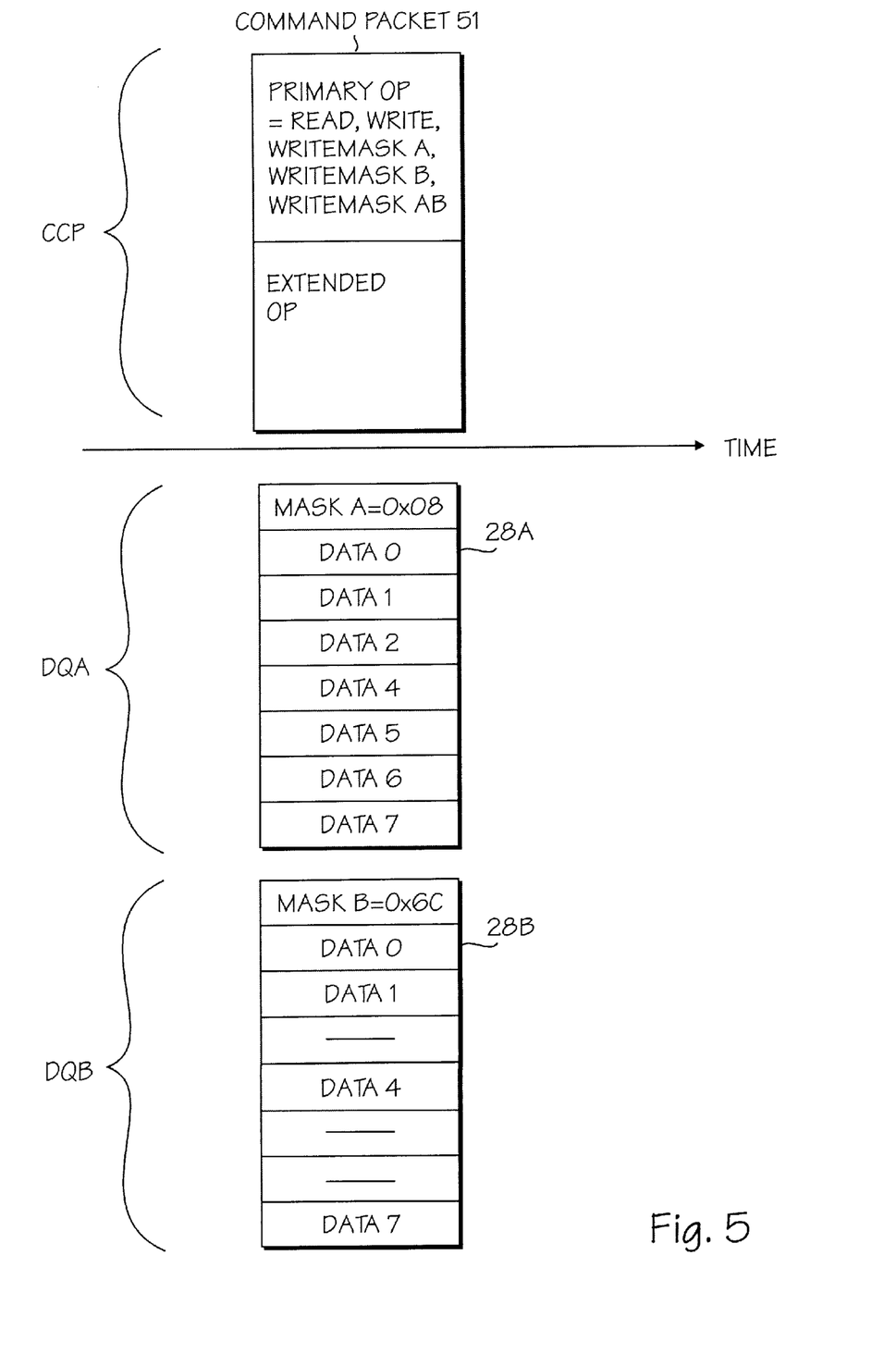
FIG. 5 illustrates the transfer of mask information in data packets on data paths of the communication channel depicted in FIG. 4.

FIG. 5 illustrates the transfer of mask information in data packets 28A, 28B on the DQA and DQB data paths of the communication channel 25 of FIG. 4. According to one embodiment, column commands are transferred via the column control path (CCP) in a command packet 51. Because many commands do not completely fill the command packet 51, it is possible to transfer two commands in the command packet 51: a primary command and an extended command. If it was necessary to send the mask information in the command packet 51, however, the mask information would largely consume the portion of the command packet 51 used to transmit the extended command. Thus, by embedding the mask information in the data packet to which it pertains, channel bandwidth is effectively increased. In this exemplary embodiment, bandwidth on the column control path is effectively increased.

As indicated in FIG. 5, the primary command in the command packet 51 may be a read command or one of at least four write commands: write, writemaskA, writemaskB, writemaskAB. The purpose of this command structure is to enable masking information to be sent on either or both of the data packets 28A, 28B on the DQA and DQB data paths. Thus, a write command indicates that neither the DQA data packet 28A nor the DQB data packet 28B includes mask information. A writemaskA command indicates that the DQA data packet 28A includes mask information, but not the DQB data packet 28B. Conversely, a writemaskB command indicates that the DQB data packet 28B includes mask information, but not the DQA data packet 28A. Finally, the writemaskAB command indicates that both the DQA and the DQB data packets 28A,28B include mask information. In the data transfer illustrated in FIG. 5, the primary command is a writemask AB command to indicate that the DQA packet 28A includes a mask value at packet offset zero and that the DQB packet 28B includes a mask value at packet offset zero. The mask value for the DQA packet 28A includes a mask value of 0×08 (the "0x" prefix indicates a hexadecimal value) so that Data3 is masked. The mask value for the DQB packet 28B includes a mask value of 0x6C hexadecimal so that Data2, Data3, Data5 and Data6 are masked. The fragmented packing protocol is used so that the unused offsets within the DQB packet 28B occur at the packet offsets that, in a non-masking write, would be used for Data3, Data5 and Data6.

The four write commands described above, write, writemaskA, writemaskB and writemaskAB, may be distinguished by two bits in the primary command within the command packet 51. Generalizing from this, if the number of bits in a mask value is less than the number of data values in a data packet, additional bits in the writemask command can be used to indicate the presence of additional mask values. More specifically, a number of bits equal to the number of bytes in the data packet divided by the number of bits per mask value may be provided in the write command to indicate the number of mask values present in the data packet (the number of bits may be rounded up to account for any remainder). For example, in a 32-byte data packet in which each any one of the 32 bytes may be masked, four bits (32/8) may be provided in the write command to indicate whether a mask value is present in any of the four respective sets of eight bytes in the data packet. Further, the mask values may be distributed among the respective sets of eight bytes or the mask values may be entered contiguously within the 32-byte data packet Although the operation of a memory subsystem has been described above in terms of a memory controller and memory devices that communicate via a packet-oriented channel, a memory subsystem based on different types of communication channels may be used in alternate embodiments. For example, the communication channel could be a communication path according to a traditional DRAM interface in which row commands and column commands are transferred to memory devices by means of column address strobe, row address strobe and write enable signals. Generally, any type of communication path that can be used to transfer a writemask command and a data packet with embedded mask information may be used without departing from the spirit and scope of the present invention.

Figure 6:
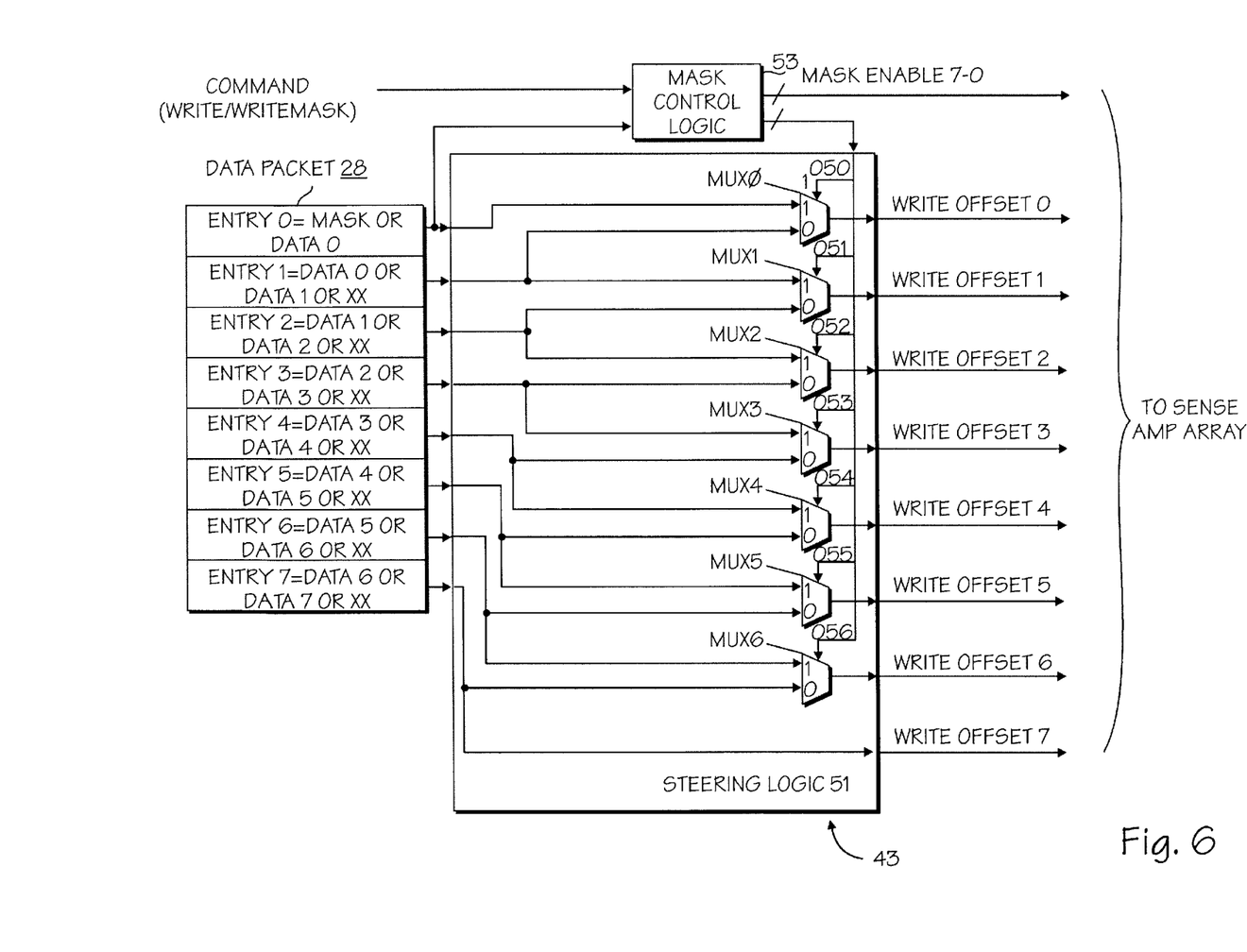
FIG. 6 illustrates control logic in a memory device according to one embodiment.

FIG. 6 illustrates control logic 43 in a memory device according to one embodiment. The control logic 43 is used to steer data values from a data packet 28 packed according to the fragmented packing protocol to the proper write offset in a sense amplifier array (or an intermediate buffer). In one embodiment, mask control logic 53 receives one or more command bits that indicate whether command is a writemask command. The mask control logic 53 also receives a value from Entry0 of the data packet (i.e., packet offset zero), or any other predetermined entry, and uses the value as a mask value if the command is a writemask command. The mask control logic 53 outputs a plurality of offset select signals, OS0–OS6, to steering logic 51 based on the command and the value from Entry0 The steering logic 51 includes a plurality of multiplexers, Mux0–Mux6, each of which outputs a value destined for a respective write offset. Each of the multiplexers, Mux0–Mux6, receives a pair of values from the data packet 28 as inputs and outputs one of the two values based on the state of a respective one of the offset select signals, OS0–OS6. The values input to a given multiplexer, Mux0–Mux6, are chosen so that the multiplexer outputs either a data value at a packet offset equal to the write offset to which the multiplexer output is destined or a data value at a packet offset equal to the write offset plus one. Thus, the inputs to Mux0 are values from Entry0 and Entry1 in the data packet, the inputs to Mux1 are values from Entry1 and Entry2, and so forth until Mux6 which receives values from Entry6 and Entry7.

The eight data packet entries, Entry0–Entry7, are packed differently depending on whether the command is a writemask command or a simple write command. If the command is a simple write command, then the data packet entries, Entry0–Entry7, are packed with Data0–Data7, respectively. That is, the packet offset of each entry is equal to the write offset of the value stored in the entry. If the write command is a writemask command, however, then Entry0 contains a mask value and the remaining entries in the data packet 28 are packed according to the fragmented packing protocol. (Other packing protocols may be used in alternate embodiments.) Thus, for Entry(i) in data packet 28, i being an integer greater than zero, the packing logic is as follows: Entry(i)=Data(i−1), if each one of Data0–Data(i−1) is unmasked; else Entry(i)=Data(i). In actuality Entry(i) is unused (indicated in FIG. 6 by "XX") if any one of Data0–Data(i−1) is masked and Data(i) is also masked. In that case, the data in Entry(i) will not be written.

Applying the above packing logic to Entry7, for example, if any one of Data0–Data6 is masked, then Entry7 contains Data7 (or is unused). If values Data0–Data6 are each unmasked, then Entry7 contains Data6.

FIG. 6 illustrates one of the advantages of the fragmented packing protocol: each data value in the data packet is destined for one of only two possible write offsets. Moreover, the two possible write offsets are adjacent one another. This simplifies the steering logic 51, because each of the multiplexers, Mux0–Mux6, only needs to select between two values from the data packet. Thus, according to one embodiment, the offset select signals, OS0–OS6, are assigned as follows: OS0 is set to "0" if the command is a write mask command, thereby causing the content of Entry1 to be output to write offset zero. Entry1 will contain Data0, if unmasked, so that Data0 will be output to write offset zero as desired. If Entry1 does not contain Data0, then Data0 is masked and the output of multiplexer0 will not be written. Therefore, if Data0 is masked, then the value output by multiplexer0 is inconsequential. The remaining offset select signals are set as follows: OS(i) is set to "1" if any one of Data0–Data(i-1) is masked. Expressed in terms of the bits of the mask value (M0–M7), OS(i) is the logical OR combination of MOM(i-1), where i is an integer greater than zero and where a "1" in a mask bit indicates that the corresponding data value is masked.

As indicated in FIG. 6, the mask control logic 53 outputs a plurality of mask enable signals MaskEnable0–MaskEnable7. These signals are used to indicate which of the values output by the steering logic are to be written. If the command bits received by the mask control logic 53 indicate a writemask command, then the respective states of the mask enable signals are set to an active or inactive state according to the states of the bits of the mask value. If the command bits do not indicate a writemask command, then the mask enable signals are set to an inactive state.

Figure 7:
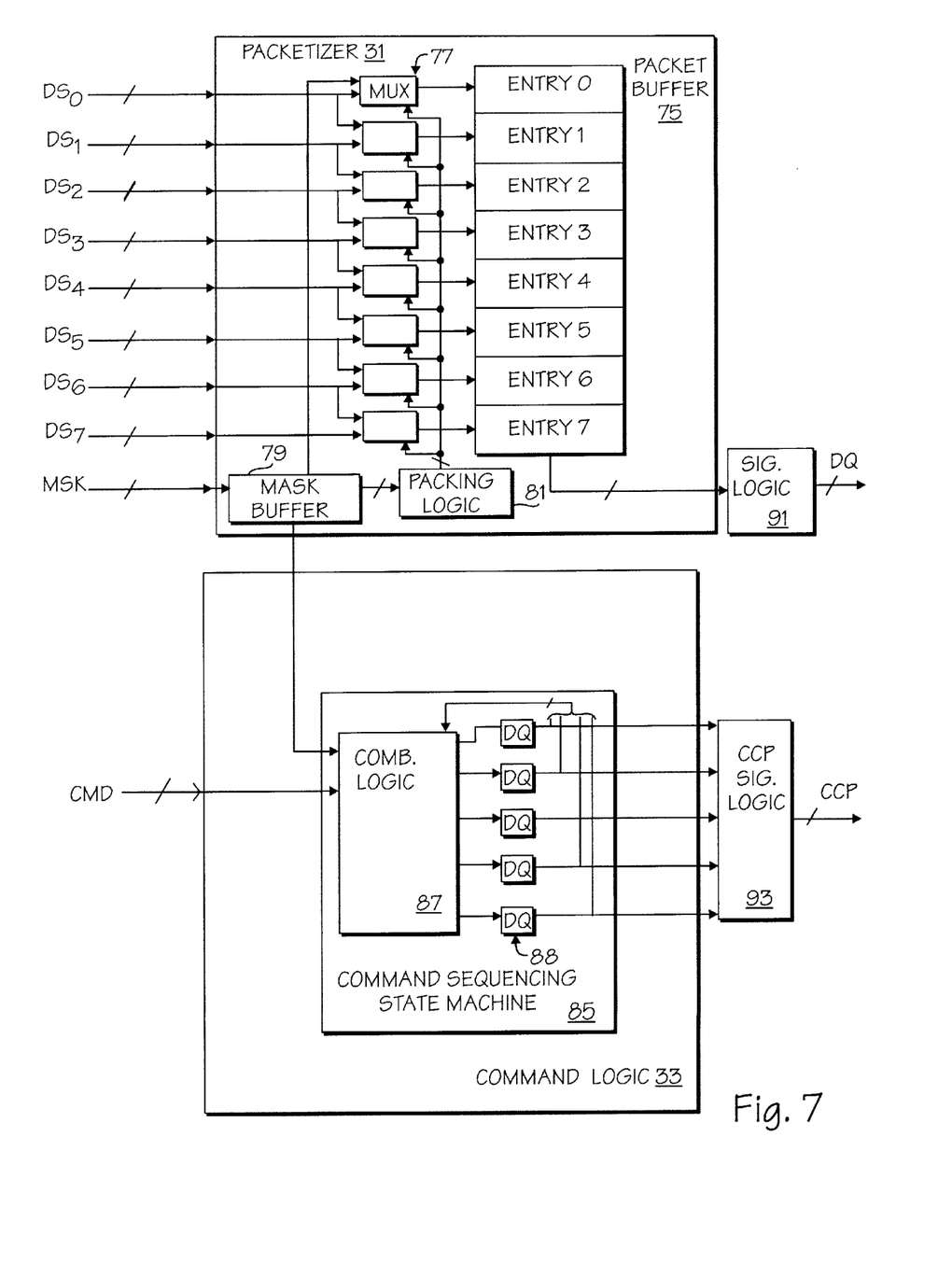
FIG. 7 depicts the packetizer and command logic of FIG. 4 according to one embodiment.

FIG. 7 depicts the packetizer 31 and command logic 33 of FIG. 4 according to one embodiment. The packetizer 31 includes inputs to receive a mask value from a mask source (MSK) and data values from respective data sources DS0–DS7. In an alternate embodiment, the mask value and data values may be received via a single time multiplexed data path or via some combination of dedicated data paths and time-multiplexed data paths. The packetizer 31 also includes a mask buffer 79, steering logic 77 and a packet buffer 75. In one embodiment, a mask value is stored in the mask buffer 79 and asserted to the packing logic 81 and to an input of a multiplexer in the steering logic 77. If the mask value indicates that the data packet is to contain no masked values, then the packing logic 81 asserts control signals to the steering logic 77 to cause the data values from sources DS0–DS7 to be transferred to entries entry0–entry7, respectively, in the packet buffer 75. If the mask value indicates that any one of the entries in the packet buffer 75 is to be masked, then the packing logic 81 asserts control signals to the steering logic 77 to cause the mask value to be placed in entry0 of the packet buffer 75 and to route the remainder of the data values from the respective data sources (excluding values from sources indicated by the mask value to be masked) to entries in the packet buffer 75 according to the above-described fragmented packing protocol. In an alternate embodiment, steering logic 77 may be adapted to implement the above-described linear packing protocol or any other protocol for packing data values and a mask value (or mask values) into a data packet. Signaling logic 91 is used to drive contents of the packet buffer 75 onto the data lines (DQ) of a packet-oriented communication channel. In one embodiment, the contents of the packet buffer are output onto the DQ lines starting with entry0 and proceeding in order to entry7. Any other order of transmission may be used in alternate embodiments. Although the packetizer is depicted as having logic for outputting a packet to only one data path (DQ), the logical structure disclosed may be replicated to support any number of data paths. Also, in an alternate embodiment, a data packet may be streamed onto the data path without having to first be buffered in a packet buffer.

Command logic 33 includes a command sequencing state machine 85 that includes combinational logic and state storage elements 88. In one embodiment, the state storage elements 88 are used both to store the state of the command sequencing state machine and to output column control commands to column control path signaling logic 93 which drives the column control commands onto a column control path (CCP) of a packet-oriented communication channel. In an alternate embodiment, separate sets of storage elements may be used for these respective purposes. The command sequencing state machine 85 includes combinational logic 87 that receives memory commands from a command source (CMD), a mask value from the mask buffer 79 and the present state of the command sequencing state machine 85 from the state storage elements 88. Based on these inputs, the combinational logic determines the next state of the command sequencing state machine. The command sequencing state machine 85 generates column command packets on the column control path by outputting successive sets of command bits to the signaling logic 93 according to one of a number of predetermined command formats. Although logic for outputting column command packets is shown in FIG. 7, command sequencing logic similar command sequencing state machine 85 may be used to output row control commands onto another command path (e.g., the row control path (RCP) shown in FIG. 4).

In one embodiment, the column command packets output by the command logic 33 include one or more bits to indicate the nature of the command (e.g., whether the command is a read, write or other type of command). If the command is a write command, one or more mask indicator bits in the command are set according to whether the mask value received from the mask buffer 79 indicates that the corresponding data packet includes masked data values. If the data packet does include a masked data value (i.e., at least one mask bit within the mask value is set), the command sequencing state machine 85 causes the one or more mask indicator bits to be set to indicate the presence of the mask value in the data packet. In one embodiment, one bit is allocated in the write command per possible mask value in a data packet. Thus, for a packetizer capable of outputting two data packets concurrently (e.g., onto the DQA and DQB data paths shown in FIG. the write command would include at least two mask indicator bits. Additional mask indicator bits may be provided to support embedding of multiple mask values per data packet.

In one embodiment, the above described packetizer 31 and command logic 33 are implemented in an application-specific integrated circuit (ASIC). In alternate embodiments, discrete components, one or more programmed processors or any combination of discrete components, ASICs and programmed processors may be used to implement the disclosed functions without departing from the scope of the present invention.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A memory controller comprising:

command logic to transmit a command that requests a memory device to store a plurality of data values; and a packetizer to transmit to the memory device a data packet that includes a plurality of data values and a mask value, the mask value indicating respective locations within the memory device at which the plurality of data values are to be stored.

2. The memory controller of claim 1 wherein the mask value indicates respective locations within the memory device by indicating respective offsets from a base address.

3. The memory controller of claim 1 wherein at least a portion of the base address is indicated by the command.

4. The memory controller of claim 1, wherein the command logic comprises a state machine having a present state and a next state.

5. The memory controller of claim 4, wherein the state machine comprises:

a plurality of state storage elements to store the present state and the next state of the state machine; and combinational logic to receive the mask value, a command, and the present state, the combination logic to determine the next state of the state machine based on the mask value, the command, and the present state.

6. The memory controller of claim 1, wherein the memory controller further comprises signaling logic coupled to the command logic, and wherein the command logic generates column command packets on a column control path by outputting successive sets of command bits.

7. The memory controller of claim 1, wherein the memory controller further comprises signaling logic coupled to the command logic, and wherein the command logic generates row command packets on a row control path by outputting successive sets of command bits.

8. The memory controller of claim 1, wherein the packetizer comprises:

a mask buffer to store the mask value;

a packet buffer having a plurality of entries; and a logic circuit coupled to the packet buffer, the logic circuit coupled to receive the plurality of data values, the logic circuit to direct the plurality of data values and the mask value into particular entries of the plurality of entries based on the mask value.

9. The memory controller of claim 8, wherein the logic circuit comprises:

a plurality of multiplexers; and packing logic coupled to the plurality of multiplexers to assert control signals to cause the mask value to be placed in one of the plurality of entries.

10. The memory controller of claim 8, wherein the plurality of data values are stored in the plurality of entries in a linear order if the mask value indicates that the data packet is to contain no masked values.

11. The memory controller of claim 8, wherein the mask value is stored in a first entry of the plurality of entries if any one of the plurality of entries is to be masked.

12. The memory controller of claim 8, further comprising: data lines; and signaling logic coupled to the data lines and the packetizer, the signaling logic to drive contents of the packet buffer onto the data lines.

13. A memory controller, comprising:

means for transmitting a command that requests a memory device to store a plurality of data values; and means for transmitting to the memory device a data packet that includes a plurality of data values and a mask value, the mask value indicating respective locations within the memory device at which the plurality of data values are to be stored.

14. The memory controller of claim 13, further comprising means for packing the plurality of data values and the mask value into the data packet.

15. The memory controller of claim 14, further comprising means for driving the data packet onto a communication channel coupled to the memory device.

16. The memory controller of claim 13, further comprising means for driving the command onto a communication channel coupled to the memory device.

17. A method of information transmission, comprising:

receiving a plurality of data values;

receiving a mask value; and packing the plurality of data values and the mask value into a data packet.

18. The method of claim 17, further comprising transmitting the data packet to a memory device.

19. The method of claim 18, wherein transmitting the data comprises driving the data packet onto a communication channel coupled to the memory device.

20. The method of claim 18, further comprising transmitting a command that requests the memory device to store the plurality of data values.

21. A memory controller, comprising:

a packet circuit to output to a memory device a packet that includes a plurality of values; and a command circuit to output a command to request the memory device to store a subset of the plurality of values within the packet, the command to indicate whether the packet includes a mask value, the mask value to indicate storage locations within the memory device for some of the plurality of values.

22. The memory controller of claim 21, wherein the packet circuit comprises:

a mask buffer to store the mask value;

a packet buffer having a plurality of entries; and a logic circuit coupled to the packet buffer, the logic circuit coupled to receive the plurality of values, the logic circuit to direct the plurality of values and the mask value into particular entries of the plurality of entries based on the mask value.

23. The memory controller of claim 22, wherein the command circuit comprises a state machine.

* * * * *